United States Patent
Farwaha et al.

[11] Patent Number: 6,087,437
[45] Date of Patent: *Jul. 11, 2000

[54] ETHYLENE/VINYL ACETATE LATEX BINDERS AND PAINTS WHICH ARE FREE OF VOLATILE COALESCENTS AND FREEZE-THAW ADDITIVES

[75] Inventors: Rajeev Farwaha; Jeffrey Pillsworth, both of Brampton; William D. Currie, Elmira, all of Canada

[73] Assignee: National Starch and Chemical Investment Holding Corporation, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/722,817

[22] Filed: Sep. 27, 1996

[51] Int. Cl.⁷ ...................................................... C08L 39/00
[52] U.S. Cl. .......................... 524/555; 524/539; 524/559; 524/745
[58] Field of Search ..................... 524/539, 559, 524/555, 745

[56] References Cited

U.S. PATENT DOCUMENTS

| | | | |
|---|---|---|---|
| 3,642,680 | 2/1972 | Jennings et al. | 524/460 |
| 3,716,504 | 2/1973 | Lindemann et al. | 524/26 |
| 3,721,636 | 3/1973 | Makower et al. | 524/460 |
| 4,118,356 | 10/1978 | Devona et al. | 524/458 |
| 4,239,563 | 12/1980 | Iacoviello | 156/72 |
| 4,503,185 | 3/1985 | Hausman et al. | 524/553 |
| 4,609,704 | 9/1986 | Hausman et al. | 524/710 |
| 4,619,964 | 10/1986 | Kielbania et al. | 524/460 |
| 4,698,384 | 10/1987 | Mao | 524/458 |
| 4,737,386 | 4/1988 | Wotier et al. | 427/389.9 |
| 4,740,394 | 4/1988 | Mudge | 427/389.9 |
| 4,745,025 | 5/1988 | Mao | 428/288 |
| 4,844,970 | 7/1989 | Goldstein et al. | 428/198 |
| 5,017,667 | 5/1991 | Cawse et al. | 526/264 |
| 5,026,765 | 6/1991 | Katz et al. | 524/561 |
| 5,084,503 | 1/1992 | Iacoviello | 524/459 |
| 5,110,864 | 5/1992 | Robinson et al. | 524/801 |
| 5,198,303 | 3/1993 | Greenlee et al. | 428/463 |
| 5,352,516 | 10/1994 | Therriault et al. | 428/355 |

FOREIGN PATENT DOCUMENTS

WO 93/23486  11/1993  WIPO.

OTHER PUBLICATIONS

Currier, Bill, "EVA Maintains Paint Properties, Lowers VOC", *Acrylated EVA: Formulating without Solvents* Article Reprinted from Aug. 1993 issue of Modern Paint & Coatings.

*Primary Examiner*—Judy M. Reddick
*Attorney, Agent, or Firm*—John D. Thallemer

[57] ABSTRACT

The invention is directed to aqueous coating compositions which are freeze-thaw stable in the absence of conventional volatile coalescing solvents and volatile freeze-thaw (F/T) additives and which utilize a latex binder which contains an EVA thermoplastic interpolymer which is prepared by emulsion polymerization of ethylene, vinyl acetate and a monomer represented by structure (I)

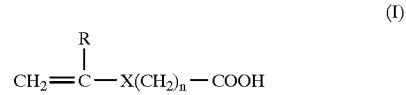

(I)

where R is hydrogen or a methyl group, X is O or NH, and n is an integer from 1 to 11 and to the latex binder which contains the EVA interpolymer.

4 Claims, No Drawings

6,087,437

ETHYLENE/VINYL ACETATE LATEX BINDERS AND PAINTS WHICH ARE FREE OF VOLATILE COALESCENTS AND FREEZE-THAW ADDITIVES

FIELD OF THE INVENTION

The present invention relates to latex binders for use in aqueous coating compositions and to aqueous coating compositions which are free of volatile coalescents and volatile freeze-thaw additives.

BACKGROUND OF THE INVENTION

The properties that are desirable in aqueous latex paints, namely the ability to be used at a temperature low enough for application over a long seasonal range, to withstand repeated cycles of freezing and thawing, and to form a film hard enough to avoid tackiness or blocking in the intended application, conventionally are enhanced in latex-based paint formulations by the addition of volatile coalescing solvents and freeze-thaw additives. These coalescing solvents, for example butyl carbitol acetate and 3-hydroxy-2,2,4-trimethylpentyl isobutyrate, and freeze-thaw additives, for example, propylene glycol and ethylene glycol, are volatile organic compounds (VOC) that are present in amounts up to 360 g per liter of paint (3 lbs. per gallon), not including water. With the universal recognition that VOCs are detrimental to the environment, there is a need for latex-based paints that contain no volatile coalescing solvents or freeze-thaw additives, yet which provide the requisite freeze-thaw and film-forming properties.

Latex paints employ latex binders as film formers and binders for pigments, fillers and the like, which are used in latex paints. The latex binders typically comprise emulsion polymers. Coalescing solvents normally are required because the latex binders used in latex paints must have the lowest possible film forming temperature (MFFT) and the highest possible glass transition temperature (Tg). The MFFT is the lowest temperature at which the polymer particles of the latex binder will mutually coalesce and form a continuous film when the water, which is the solvent base, evaporates. Polymers that have low MFFT extend the temperature conditions under which the paint can be applied. The Tg is the temperature at which a polymer changes from an amorphous, soft and tacky state to a glassy, hard, and rigid state. Polymers with high Tg values will result in a paint coating that will be hard, resistant to abrasion and resistant to blocking. Volatile coalescing solvents effectively lower the Tg of the polymer to meet the desired low MFFT on application, and then eventually diffuse out of the paint and evaporate under normal ambient conditions of temperature, humidity and atmospheric pressure, leaving a high Tg film. Freeze-thaw additives are added to paint formulations simply to impart freeze-thaw stability during transportation and storage.

The pigments or fillers present in the paint formulation result in anti-blocking characteristics in the paint film. The relationship between hardness of the coating and the amount of pigment is represented by pigment volume concentration (PVC), which is the fractional volume of pigment in a unit volume of resin. Thus, low PVC coatings, such as semi-gloss paints, contain relatively low levels of pigment, and high PVC coating compositions, such as satin to flat paints, contain high levels of pigments. Polymers with low Tg and MFFT in low PVC paint formula will exhibit blocking tendencies. On the other hand, the soft latices will show anti-blocking characteristics in high PVC paint formulas. In low PVC paint formulas, glass transition temperature of the polymer (Tg) determines the hardness of the coating. In high PVC paint formulas, pigments determine the hardness of the coating. The Tg of the polymer can be calculated using the Fox equation. $1/Tg \text{ (polymer)} = W_{(a)}/Tg_{(a)} + W_{(b)}/Tg_{(b)}$ where $W_{(a)}$ and $W_{(b)}$ are the weight fractions of comonomers (a) and (b) and $Tg_{(a)}$ and $Tg_{(b)}$ are the glass transition temperatures for homopolymers (a) and (b), respectively in °K. Glass transition temperatures for various homopolymers are available in may literature sources, including J. Brandup and E. H. Immergut, *Polymer Handbook,* 2nd ed., John Wiley & Sons, New York, pp. 139–192 (1975).

There is a growing concern about the potentially adverse environmental and health effects of many of the volatile coalescing solvents and freeze-thaw additives. There is a growing need for polymers, for use in latex binders in latex paints, which will provide desired hardness properties, adequate film formation at low temperature, and flexibility. In addition, it is also desirable to eliminate volatile coalescents and freeze-thaw additives from trade sale paints without compromising physical properties such as coating hardness, low MFFT and freeze-thaw stability. Accordingly, it would be desirable to develop polymeric latex binders which have the balance of MFFT and Tg required for use in latex paint compositions, which are free of volatile coalescing solvents or freeze-thaw additives and which maintain adequate freeze-thaw stability and abrasion resistance.

Latex binders based on ethylene/vinyl acetate (EVA) copolymers may be used in the formulation of latex paints. The EVA copolymers are known to provide latex paints with film-forming properties and abrasion resistance which are sufficient for their intended use. However, these polymers have been found not to provide freeze-thaw stability to formulated latex paints which utilize latex binders based on EVA. This has been found to be true even with the addition of significant amounts of volatile freeze-thaw additives to the latex paints. This is unlike conventional latex paints based on acrylic and vinyllacrylic latex binders, where volatile freeze-thaw additives are used to provide freeze-thaw stability to the latex paints.

It would be desirable to develop EVA-based latex binders which can be used to prepare latex paints, which not only exhibit the desired film-forming and abrasion resistance properties for which EVA is known, but also which are freeze-thaw stable in the absence of volatile coalescing or freeze-thaw solvents.

It now has been discovered that EVA-based latex binders according to the present invention may be used to formulate EVA-based latex paints which not only are freeze-thaw stable in the absence of volatile coalescing or freeze-thaw solvents, but which retain the film-forming properties and abrasion resistance for which EVA is known.

SUMMARY OF THE INVENTION

The present invention is directed to aqueous coating compositions, particularly latex paint compositions, which are free of volatile coalescing solvents and freeze-thaw (F/T) additives and which comprise a latex binder which contains an EVA thermoplastic interpolymer which is prepared by emulsion polymerization of ethylene, vinyl acetate and a monomer represented by structure (I)

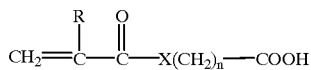

where R is hydrogen or a methyl group, X is O or NH, and n is an integer from 1 to 11. The invention also is directed to the latex binder which utilizes the EVA interpolymer. The vinyl acetate comprises a major proportion of the total monomer content and is present in minimum amounts effective to provide the latex binder and a latex paint which employs the latex binder with abrasion resistance and film-forming properties which are sufficient for their intended use; the ethylene monomer comprises a minor proportion of the total monomer content; and the monomer represented by Structure I is present at a minimum amount of the total monomer content which is effective to provide the latex paint which employs the latex binder with freeze-thaw stability in the absence of a volatile freeze-thaw additive and a maximum amount which is effective to maintain the sufficient abrasion resistance and film-forming properties.

DETAILED DESCRIPTION OF THE INVENTION

The latex binders of this invention are particularly advantageous for use in aqueous coating compositions. The first advantage of these binders is that they permit the formulation of aqueous coatings having excellent balance of film formation and abrasion resistance properties. The second advantage is that they can be used to formulate latex paints which require no volatile freeze-thaw additive, such as ethylene glycol or propylene glycol, yet which exhibit excellent freeze-thaw stability. It is preferred that the latex binders and the latex paints of the present invention be essentially free of volatile coalescing solvents and volatile freeze-thaw additives. More preferably, the binders and paints will be free of volatile coalescing solvents and volatile freeze-thaw additives. One will recognize that small amounts of either volatile coalescing solvents or freeze-thaw additives may be added if desired, although they are not required to practice the present invention and should not be present in appreciable amounts which would alter the basic properties of the latex binders or paints.

The latex binders according to the present invention must have a MFFT of less than 5° C., yet provide sufficient abrasion resistance in order to function as a binder in the latex paint composition according to the present invention. Generally, the level of abrasion resistance required of a latex paint will depend upon the anticipated end-use of the paint. More abrasion resistance is required where the conditions under which the paint must endure are more severe. Additionally, the latex binders and the paint compositions must be freeze-thaw stable, meaning that they survive five freeze-thaw cycles as described herein. Finally, the paint compositions must be resistant to blocking, i.e. the films formed therefrom must not be tacky to the extent that particulate contamination, such as dust particles and the like, would adhere to the film once the film has dried, or that substrates which have been coated with the paint formulations would adhere one to the other when stacked one on top of the other, for instance.

According to the present invention, it has been discovered that freeze-thaw stable, polymeric latex binders which have a MFFT of less than 5° C. and which provide sufficient abrasion and blocking resistance required for use as a latex binder in latex paint compositions according to the present invention may be prepared without the use of volatile coalescents or volatile freeze-thaw additives. "Volatile coalescent" and "volatile freeze-thaw additive", as used herein, refer to those coalescents and freeze-thaw additives which diffuse out from the applied film of the latex paint and evaporate under typical ambient conditions. By typical ambient conditions, it is meant those conditions of temperature, humidity and barometric pressure under which latex paints typically are applied and cured.

The term "latex" is used herein in its conventional meaning, i.e., a dispersion of particulate matter in an aqueous phase which contains an emulsifier or surfactant suitable for preparing the latex. Latex binders, as used herein, comprise a polymer dispersed in an aqueous phase with an appropriate emulsifier system.

In a first embodiment of the invention, there are provided latex binders which comprise an EVA thermoplastic interpolymer which is prepared by emulsion polymerization of from about 10 pphm (parts by weight per hundred parts by weight of monomer) about 25 pphm of ethylene, vinyl acetate, in minimum amounts effective to provide the latex binder and latex paints which contain the latex binder with sufficient abrasion resistance and film-forming properties, from 0.05 pphm to about 1.0 pphm of the monomer represented by Structure (I); and, optionally, comonomers, up to a maximum amount effective to maintain the sufficient abrasion resistance and film-forming properties of the latex binders and latex paints which contain the latex binders of the present invention.

Preferably, the EVA interpolymer is the emulsion polymerization product of from about 10 pphm to about 25 pphm of ethylene monomer, from about 60 pphm to about 90 pphm of vinyl acetate monomer, from 0.05 pphm to about 1.0 pphm of the monomer represented by Structure I; and from 0 to 15 pphm of the comonomer. More preferably, the EVA interpolymer is prepared by emulsion polymerization of from about 10 pphm to about 20 pphm of ethylene, from about 70 pphm to about 90 pphm of vinyl acetate, from about 0.1 to about 0.8 pphm of the monomer represented by Structure I; and, from 0 to about 10 pphm of the comonomer. Even more preferably, from about 10 pphm to about 15 pphm ethylene, about 80 pphm to about 90 pphm VA, 0.15 to about 0.6 pphm of Structure I; and, 0 to 5 pphm of the comonomer are used in preparing the EVA interpolymer.

In one embodiment, Structure (I) monomer may be prepared by dimerization of acrylic acid in the presence of a base, thereby yielding beta-carboxy ethyl acrylate (i.e., R is H, X is O and n is 2).

The Structure (I) monomer must be present in minimum amounts effective to provide a latex paint which employs the latex binders of the present invention with freeze-thaw stability, without the use of volatile freeze-thaw additives. If less than the effective amount is used, conventional volatile F/T additives must be used in order to provide the latex paint with F/T stability. Preferably, the Structure (I) monomer will be used at a minimum level of about 0.1 pphm, more preferably 0.15 pphm. The maximum level of Structure (I) monomer which may be used is limited by its detrimental affects on the abrasion resistance of the latex paint which employs the inventive binders. It has been found that if greater than about 1 pphm of the Structure (I) monomer is used, the abrasion resistance of the latex paints employing the binder is reduced to a level which is no longer acceptable.

The polymer also may comprise the polymerized residue of at least one acrylate monomer. Acrylate monomer as used herein includes esters of monocarboxylic acids and the di-esters of dicarboxylic acids, and does not include the half-esters of dicarboxylic acids. Preferred acrylate monomers are selected from the group consisting of $C_1$–$C_{10}$ alkyl esters of α,β-ethylenically unsaturated $C_2$–$C_6$ monocarboxylic acids; hydroxy $C_1$–$C_4$ alkyl esters of α,β-ethylenically unsaturated $C_2$–$C_6$ monocarboxylic acids; and $C_4$–$C_8$ alkyl diesters of α,β-ethylenically unsaturated $C_4$–$C_8$ dicarboxylic acids. Preferably, the acrylate monomer is selected from the group consisting of $C_1$–$C_{10}$ alkyl esters of acrylic and methacrylic acid and $C_4$–$C_8$ alkyl di-esters of maleic, itaconic and fumaric acids. Preferably, at least one $C_4$–$C_8$ alkyl ester of acrylic acid is utilized. Particularly preferred acrylate monomers include methyl acrylate, ethyl acrylate, butyl acrylate, 2-ethyl hexyl acrylate, decyl acrylate, methyl methacrylate, butyl methacrylate, l-butyl methacrylate, l-bornyl methacrylate, hydroxy ethyl acrylate and hydroxy ethyl methacrylate. When used, the acrylate monomer is present at levels of from about 0.1 pphm to about 10 pphm.

The polymer may be prepared utilizing a monomer which contains at least one carboxyl group attached directly to the olefinic carbon. Such monomers preferably are selected from the group consisting of α,β-ethylenically unsaturated $C_3$–$C_8$ monocarboxylic acids, α,β-ethylenically unsaturated $C_4$–$C_8$ dicarboxylic acids and the anhydrides thereof, and the $C_4$–$C_8$ alkyl half-esters of the α,β-ethylenically unsaturated $C_4$–$C_8$ dicarboxylic acids. Exemplary monomers include acrylamido methyl propane sulfonic acid, styrene sulfonate, sodium vinyl sulfonate, acrylic acid and methacrylic acid, and the $C_4$–$C_8$ alkyl half esters of maleic acid, maleic anhydride, fumaric acid, and itaconic acid.

Such carboxyl-containing monomers may be utilized to impart mechanical stability to the latex binder and the latex paints, i.e., they are stable upon application of shear to the latex binders or paints, such as during pumping of the latex binder and/or the paint compositions during processing and during addition of the latex binder to the "grind" portion of the paint formulation during the preparation thereof. The "grind" is that portion of the paint formulation which includes the pigments, fillers and the like. The pigments and fillers are "ground" using conventional mixing techniques, to a particular Hegmen dispersion value. The grind is then "let down", that is, the balance of the paint composition, including the latex binder and any balance of water, are added to the grind and mixed. While such monomers may be used at low levels to impart mechanical stability to the latex, excess levels of such monomers result in a decrease in abrasion resistance of the films formed from the latex paints. Accordingly, the presence of such monomers is minimized and the monomer may be used at levels up to about 1 pphm. Preferably, less than 1 pphm of such carboxyl-containing monomers are used, more preferably, less than 0.5 pphm of such carboxyl-containing monomers are used.

In order to optimize the wet adhesion of the latex paint formulation, the polymer may comprise 0 to about 2 pphm, preferably 0 to about 1 pphm, of the polymerized residue of a wet adhesion monomer, or a combination of wet adhesion monomers. These monomers are well known in the art and include N-(2-methacryloyloxyethyl) ethylene urea, N-(2-methacryloxyacetamidoethyl)-N, N'-ethyleneurea, allyla-lkyl ethylene urea, N-methacrylamidomethyl urea, N-methacryoyl urea, N-(methacrylamido)ethyl urea (DV2422, Rhone-Poulenc), allyl carbamato ethyl ethylene urea, and alkyl ureido wet adhesion monomer (Sipomer WAM®, Rhone Poulenc). When used, the wet adhesion monomer will be present in an amount of from about 0.2 to about 2.0 pphm.

The polymers of the present invention are thermoplastic versus thermoset. In other words, there is no crosslinking of the polymer during polymerization, nor does the polymer undergo crosslinking during film formation once applied to a substrate, either chemically, thermally or by irradiation. Specifically, monomers which contain a moiety which reacts with carboxyl groups such that crosslinking takes place may not be used in preparing the polymers of the present invention. Such monomers include epoxy-containing monomers. Additionally, catalysts which enhance reaction/crosslinking with hydroxyl-containing monomers may not be used in preparing polymers of this invention.

Methods for preparing ethylene/vinyl acetate copolymer emulsions are well known in the art and any of the customary procedures, together with the incorporation of ethylene pressure, can be used such as those emulsion polymerization techniques described in such chemistry texts as POLYMER SYNTHESIS, Vol. I and II, by Stanley R. Sandler and Wolf Karo, Academis Press, New York and London (1974), and PREPARATIVE METHODS OF POLYMER CHEMISTRY, second edition, by Wayne R. Sorenson and Tod W. Campbell, Interscience Publishers (John Wiley &Sons), New York (1968).

A preferred method for preparing the ethylene/vinyl acetate copolymer emulsions of this invention having a solids content of about 40 to about 65 weight percent involves the initial preparation of a seed emulsion. A premix comprising emulsifying agents and hydroxy ethyl cellulose initially is charged to a polymerization reactor, agitated and purged with nitrogen twice and then with ethylene. A required amount of vinyl acetate monomer is charged to the reactor for seed formation. The reactor then is pressurized with the requisite ethylene pressure to provide the EVA copolymer having the desired ethylene content. The reaction is redox polymerized. The pressurized ethylene source can be shut off from the reactor so that the ethylene pressure decays as it is polymerized, or it can be kept open to maintain the ethylene pressure throughout the reaction, i.e., make-up ethylene. At about 40° C., the pressure is equilibrated to a desired ethylene pressure.

After seed formation, the redox components and monomer slow-add are added over a period of time. At the end of reaction, the material (having free VA monomer of approximately 2–3%), is transferred to a stripper. Reducing/oxidizing agents then are added until the free monomer content is reduced to less than 1%, preferably less than 0.1%. The polymerization reaction medium is cooled and adjusted to a pH of about 4 to 6 to maintain a stable emulsion. Alternately, steam-stripping methods may be used to lower residual VA monomer.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc) and those catalysts that are activated in the water phase by a water-soluble reducing agent. Such catalysts are employed in a catalytic amount sufficient to cause polymerization. As a general rule, a catalytic amount ranges from about 0.1 to 5 pphm.

The emulsifier system employed in preparing the polymeric latex binder contains a major proportion of nonionic emulsifiers (i.e., >50 weight percent based on the total weight of emulsifier). It is critical that the emulsifier system contain a major proportion of the nonionic emulsifier in order to enhance F/T stability. A minor proportion of an anionic emulsifier may be used, although excess anionic emulsifier tends to reduce F/T stability. Preferably the emulsifier system will contain greater than 60 weight percent nonionic emulsifier and less than 40 weight percent anionic emulsifier, more preferably greater than 80 weight percent nonionic emulsifier and less than 20 weight percent anionic emulsifier. Preferably, the emulsifier system will contain a mixture of the nonionic and anionic emulsifiers, although the emulsifier system may consist of nonionic emulsifiers.

Suitable nonionic emulsifiers include polyoxyethylene condensates. Exemplary polyoxyethylene condensates which can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

Nonionic emulsifying agents which can be used also include a series of surface active agents available from BASF under the PLURONIC and TETRONIC trade names. PLURONIC® emulsifiers are ethylene oxide (EO)/Propylene oxide (PO)/ethylene oxide block copolymers which are prepared by the controlled addition of PO to the two hydroxyl groups of propylene glycol. EO is then added to sandwich this hydrophobe between two hydrophilic groups, controlled by length to constitute from 10% to 80% (w/w) of the final molecule. PLURONIC® R emulsifiers are PO/EO/PO block copolymers prepared by adding EO to ethylene glycol to provide a hydrophile of designated molecular weight. PO is then added to obtain hydrophobic blocks on the outside of the molecule. TETRONIC® emulsifiers are tetra-functional block copolymers derived from the sequential addition of PO and EO to ethylene-diamine. TETRONIC® R emulsifiers are produced by the sequential addition of EO and PO to ethylene-diamine. In addition, a series of ethylene oxide adducts of acetyleneic glycols, sold commercially by Air Products under the Surfynol® trade name, are suitable as nonionic emulsifiers.

Representative anionic emulsifiers include the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl sulfosuccinate and dioctyl sodiumsulfosuccinate. The emulsifiers are employed in amounts effective to achieve adequate emulsification of the polymer in the aqueous phase and to provide desired particle size and particle size distribution. Other ingredients known in the art to be useful for various specific purposes in emulsion polymerization, such as, acids, salts, chain transfer agents, and chelating agents, also may be employed in the preparation of the polymer. For example, if the polymerizable constituents include a monoethylenically unsaturated carboxylic acid monomer, polymerization under acidic conditions (pH 2 to 7, preferably 2 to 5) is preferred. In such instances the aqueous medium can include those known weak acids and their salts that are commonly used to provide a buffered system at the desired pH range.

The manner of combining the polymerization ingredients can be by various known monomer feed methods, such as, continuous monomer addition, incremental monomer addition, or addition in a single charge of the entire amounts of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Following polymerization, the solids content of the resulting aqueous heterogeneous polymer latex can be adjusted to the level desired by the addition of water or by the removal of water by distillation. Generally, the desired level of polymeric solids content is from about 20% to about 60% by weight on a total weight basis.

The size of the polymer particles can vary; however, for optimum water resistant, it is preferable that the particles have an average diameter of less than 500 nanometers. In general, for the polymer of this invention, the smaller the average particle size, the more water resistant the polymer. Suitable particle sizes generally can be achieved directly from the polymerization. However, screening of the resulting latex to remove particles outside the desired size range, thus narrowing the particle size distribution, may be employed.

For various applications, it is sometimes desirable to include small amounts of additives, such as bactericides, pH modifiers, and antifoamers, incorporated in the latex. This may be done in a conventional manner and at any convenient point in the preparation of the latexes.

The paints are formulated using techniques known to those skilled in the art of manufacturing paint. Generally, water, defoamer, pigment, filler and surfactant stabilizer (in addition to emulsifiers used during emulsion polymerization) are combined to form the grind, where the pigments and fillers are ground to a desired particle size as indicated by a Hegman reading of 2 to 3. Additional water, latex binder, rheology modifiers, biocides and the like are added to the grind and the entire batch is blended and adjusted to desired Hegman readings and viscosity.

The following test procedures and organic-solvent-free, latex paint formulations were used to evaluate the latex binders and latex paints of the present invention.

Low Temperature Film Formation

The paint composition was conditioned in a 2–5° C. refrigerator for 1 hour, and a 3 mil film of the paint then applied over a 19 BR leneta chart. The film was allowed to dry overnight at 2–5° C. and visually examined for signs of cracking. A paint was deemed to form acceptable films when no difference could be seen between the film applied at 5° C. and a film applied at room temperature (22° C).

Abrasion Resistance (Scrubability) ASTM 24860

A test scrub panel was prepared by drawing a 7.0 mil film of paint on a leneta chart and allowing the paint to dry for 7 days in an open room maintained at 23±2° C. and 50±5% relative humidity. The dried chart was affixed to a glass panel and put into a scrub machine equipped with a scrub brush and a basin for holding the text panel. The brush was prepared by immersing it overnight in 2% solution of Triton® X-100 surfactant, a proprietary alkylaryl polyether available from Union Carbide. The brush was placed in the machine holder and the test scrub panel was put under the brush. The brush bristles were spread evenly with 10 grams of a standardized scrub medium (available from Leneta Co.).

The panel was then wet with 5 ml of reagent water in the path of the brush. The scrub machine was started. After every 800 stokes before failure, 10 grams of scrub medium and 5 ml of reagent water were added to the brush bristles. The number of strokes to the paint at which 0.5 inch of black chart shows through the test panel was recorded.

Freeze-Thaw Stability Test

The paint sample was transferred into a 250 ml stainless steel can and was kept in the freezer for 18 hours at −18° C. The sample was removed from the freezer and was allowed to thaw for 24 hours to room temperature. The sample was observed for flow properties, lump formation, and coagulation. The sample was considered to pass if it exhibited no coagulation. This cycle of freezing-thawing was repeated until either the paint coagulated or until a total of five cycles were completed with no coagulation. Compositions which exhibit no coagulation after five freeze/thaw cycles are considered to be acceptable with respect to freeze/thaw stability. Compositions which do not complete five cycles without exhibiting coagulation are considered to be unacceptable.

FORMULA I
55% PVC FLAT

| | Pounds/100 U.S. Gal. |
|---|---|
| Water | 375.0 |
| Colloid 226-35 | 7.0 |
| Colloid 643 | 2.5 |
| Natrosol ® 250 HR | 6.0 |
| Kronos 2020 | 178.0 |
| Satintone W | 155.0 |
| Omyacarb 6 | 200.0 |
| Igepal ® CO-630 | 2.0 |
| Water | 131.0 |
| EVA latex | 310.0 |
| AMP-95 | 2.0 |
| Colloid 643 | 2.5 |
| Kathon LX | 0.4 |
| | 1371.4 |

FORMULA II
55% PVC FLAT

| | Pounds/100 U.S. Gal. |
|---|---|
| Water | 250.0 |
| Tamol 731 | 6.5 |
| KTPP | 1.3 |
| Colloid 643 | 2.0 |
| Triton CF-10 | 2.0 |
| Natrosol Plus 430 | 1.0 |
| Kronos 2020 | 165.0 |
| Huber 683 | 80.0 |
| Calcium Carbonate (Omya 6) | 165.0 |
| Mica 325 | 40.0 |
| Disperse Hegman 2–3 | |
| Water | 170.0 |
| Natrosol Plus 430 (Premix) | 2.5 |
| Water (Premix) | 35.0 |
| Rheolate 350 | 15.0 |
| Latex (55%) | 260.0 |
| Colloid 643 | 2.0 |
| Kathon LX | 0.4 |
| | 1190.7 |

FORMULA III
27% PVC Semi-Gloss

| | Pounds/100 U.S. Gal. |
|---|---|
| Water | 240.0 |
| BYK 155 | 3.2 |
| BYK 034 | 1.6 |
| Potassium Hydroxide | 3.2 |
| Kronos 2020 | 240.0 |
| ASP-170 | 40.0 |
| Polyphobe 102 | 20.0 |
| Disperse Hegman 5–6 | |
| Water | 76.0 |
| Rexol 45/407 | 4.8 |
| Resin 55% Solids | 440.0 |
| Kathon LX | 0.4 |
| BYK 034 | 1.6 |
| Totals | 1070.8 |

FORMULA IV
27% PVC SEMI-GLOSS

| | Pound/100 U.S. Gal. |
|---|---|
| Water | 245.0 |
| BYK 155 | 5.0 |
| BYK 034 | 2.0 |
| Natrosol 250 HR | 6.0 |
| Kronos 2020 | 290.0 |
| Omyacarb 3 | 50.0 |
| Disperse Hegman 5–6 | |
| Igepal CO-630 | 2.0 |
| AMP 95 | 2.0 |
| Water | 30.0 |
| BYK 034 | 2.0 |
| Kathon LX | 0.5 |
| Solvent Free EVA | 635.0 |
| Total | 1269.5 |

FORMULA V
27% PVC SEMI-GLOSS

| | Pounds/100 U.S. Gallon |
|---|---|
| Water | 125.0 |
| BYK 155 Dispersant | 3.5 |
| BYK 034 Defoamer | 2.0 |
| Surfynol CT-111 | 2.5 |
| Potassium Hydroxide 45% | 3.5 |
| Kronos 2020 | 250.0 |
| ASP 170 | 45.0 |
| TT-935 | 4.0 |
| Disperse Hegman 5–6 | |
| Water | 185.0 |
| TT-935 | 9.0 |
| RM 2020 | 12.0 |
| AMP-95 | 1.0 |
| EVA Latex | 445.0 |
| Kathon LX | 0.4 |
| BYK 034 | 2.0 |
| | 1088.9 |

EXAMPLE I

Using the following semi-continuous emulsion polymerization technique, a series of EVA interpolymers was prepared. The ingredients for one of the latexes that were prepared were as follows. The concentration is reported in pphm.

| Compound | Grams | In pphm |
|---|---|---|
| Initial Charge | | |
| Water | 2200.0 | 55.00 |
| Cellosize QP09L | 36.0 | 0.90 |
| Non-ionic emulsifier[1] | 178.0 | 4.15 (Active) |
| Anionic Emulsifier[2] | 36.0 | 0.18 (Active) |
| Vinyl Acetate | 850.0 | 21.25 |
| Ethylene | 575 psi | 11.00 |
| Monomer Slow-Add | | |
| Vinyl acetate | 2536.8 | 63.75 |
| Butyl acrylate | 159.2 | 4.0 |
| Initiator Slow-Add | | |
| Water | 250.0 | 6.25 |
| Sodium Persulfate | 8.32 | 0.21 |
| Sodium bicarbonate | 2.50 | 0.06 |
| Reducer Slow-Add | | |
| Water | 250.00 | 6.25 |
| SFS | 6.76 | 0.17 |
| Redox Scavenge | | |
| 1) Water | 15.0 | 0.38 |
| Temp | 6.0 | 0.15 |
| 2) Water | 70.0 | 1.75 |
| SFS | 6.0 | 0.15 |
| Ph Adjustment | | |
| Water | 90.0 | 2.25 |
| Sodium bicarbonate | 5.0 | 0.13 |
| Preservative Adds | | |
| Water | 5.0 | 0.13 |
| Hydrogen Peroxide | 5.0 | 0.13 |
| Water | 10.0 | 0.25 |
| Kathon LX (1.5%) | 13.7 | 0.34 |

1) = a blend of nonylphenol ethoxylate and Pluronic nonionic surfactants
2) = alkyl benzene sulfonate In a 10-liter autoclave, an initial charge of water, surfactant, vinyl acetate and butyl acrylate was charged. The reactor was flushed with ethylene and the agitator was set at 400 rpm. The temperature was raised to 50° C. and the ethylene was added to a pressure to 575 psig. When the contents of the reactor reaches 50° C., the redox slow adds are started at a 3 hour slow-add rate and changed to 4.5 hour rate after the contents reach 52° C. When the content temperature increases to 52° to 53° C. and while the jacket remains at 50° C., redox slow adds are adjusted to 4.5 hour rate and the jacket is set to 65° C. When contents reach 65° C., after a 5 minute period, the 4 hour of monomer slow-add is commenced. The jacket is set to cascade to keep contents at 65° C. throughout the reaction period. After monomer slow-add is finished and free vinyl acetate content is approximately 2 percent, the contents are pumped to a hold tank having agitator set at approximately 200 rpm. A redox post addition is added, followed by defoamer, buffer solution, redox scavenger and preservative. The resulting latex was designated 1A and showed the following physical properties: 56.8% solids; 360 NM particle size, 6.6° C. Tg; MFFT<0° C.; 2780 cps viscosity.

EXAMPLE 2

Another latex of the same monomer composition as latex 1A was synthesized using the procedure of Example 1 and employing 2 pphm of anionic emulsifier, no nonionic emulsifier, and 1.1 pphm of Cellosize QP 09L. This latex was designated 1B and had the following physical properties: 54.5% solids; 437 NM particle size, Tg 8° C.; 0° C. MFFT; 4.8 pH.

EXAMPLE 3

A series of latexes was synthesized based on Example 2 with varying amounts (pphm) of comonomers having at least one carboxyl group attached directly to the olefinic carbon and designated latex 1C, 1D, 1E and 1F, respectively. The remaining monomer levels were the same as in Example 2.

| Comonomer | 1C | 1D | 1E | 1F |
|---|---|---|---|---|
| Monoethyl maleate | 0.3 | 0.5 | | |
| Acrylic Acid | | | 0.3 | 0.5 |
| Physical Properties | | | | |
| % Solids | 54.8 | 53.9 | 54.9 | 55.1 |
| PS (non) | 417 | 384 | 400 | 423 |
| MFFT °C. | <0 | <0 | <0 | <0 |

EXAMPLE 4

A series of latexes was synthesized based on Example 1, varying comonomers and levels thereof as noted in herein below and designated latex 1G, 1H and 1I, respectively. The levels of the remaining monomers were the same as in Example 1.

| | 1G | 1H | 1J |
|---|---|---|---|
| Monoethyl maleate | 0.5 | — | — |
| Acrylic Acid | | 0.3 | 0.15 |
| Physical Properties | | | |
| % Solids | 54.3 | 56.5 | 55.1 |
| Viscosity (cps) | 2120 | 3930 | 2720 |
| PS (nm) | 366 | 371 | 372 |

Materials Description and Source:
1. BYK® 155 dispersant is a solution of sodium salt of an acrylic acid copolymer, available from BYK Chemie.
2. BYK® 034 defoamer is a proprietary mixture of hydrophobic components in paraffin based mineral oil, silicone containing, available from BYK Chemie.
3. Surfynol® CT-111 surfactant is an ethylene oxide adduct of acetyleneic glycols, available from Air Products.
4. Kronos 2020 is rutile titanium dioxide, available from Kronos, Inc.
5. ASP-170 is aluminum silicate pigment, available from Engelhard Corporation.
6. Polyphobe is a proprietary urethane associative thickener, available from Union Carbide.
7. Igepal CO-630 is a nonylphenol ethoxylate non-ionic surfactant, available from Rhone-Poulenc.
8. Kathon LX is a microbiocide having active ingredients of 5-chlor-2-methyl-4-isothazolin-3-in-one and 2-methyl-4-isothazolin-3-in-one present in an amount up to 14%, available from Rohm & Haas.
9. Natrosol 250 HR and 430 Plus are hydroxyethyl cellulose, available from Hercules.
10. RM 2020 is a proprietary urethane associative thickener, available from Rohm & Haas.
11. Acrysol TT-935 is an acrylic polymer associative thickener, available from Rohm & Haas.
12. AMP-95 is 2-amino-2-methyl-1-propanol, available from Angus Chemicals.

13. Colloid 643 dispersant is a proprietary liquid, available from Rhone-Poulenc
14. Colloid 226-35 dispersant is a polycarboxylate sodium salt, available from Rhone-Poulenc.
15. Satintone W is calcined aluminum silicate, available from Engelhard Corporation.
16. Omyacarb 3 and 6 are calcium carbonate, available from Omya.
17. Tamol 731 is a sodium salt of polymeric carboxylic acid, available from Rohm & Haas.
18. Triton CF-10 is a modified alkylaryl polyether surfactant, available from Union Carbide.
19. Huber 683 is clay, available from J.M. Huber Corporation.
20. Mica 325 is aluminum potassium silicate, available from Mica.
21. Rheolate 350 is a proprietary 50% active nonionic associative thickener, available from Rheox.
22. Cellusize QP-09L is hydroxyethyl cellulose, available from Hercules.
23. Rexol 45/407 is an octylphenol ethoxylate surfactant available from Hart Chemical.
24. Hegman is a unit of grind used in the industry.
25. SFS stands for sodium formaldehyde sulfonate.
26. KTPP stands for potassium tripolyphosphate.

EXAMPLE 5

Latexes 1B-1F were formulated in Semi-gloss Paint Formula III and evaluated for film formation, scrub resistance and F/T stability. Results are presented in Table I.

TABLE I

| | Semigloss Paint Formula III | | | | |
|---|---|---|---|---|---|
| | Latex | | | | |
| | 1B | 1C | 1D | 1E | 1F |
| Film Formation (5° C.) | Yes | Yes | Yes | Yes | Yes |
| Scrub Resistance (cycles) | >4000 | 1375 | 980 | 970 | 900 |
| Freeze-thaw | fail | fail | fail | fail | fail |

As the data in Table I indicates, incorporation of comonomers having at least one carboxyl group attached to the olefinic carbon result in drastic loss of abrasion resistance. In addition, latexes prepared utilizing only anionic emulsifiers were not F/T stable, even in combination with the carboxyl monomers having at least one carboxyl group attached to the olefinic carbon.

EXAMPLE 6

Latexes 1A, 1G and 1H were formulated into Paint Formula III and evaluated for film formation, scrub resistance and F/T stability. Results are presented in Table II.

TABLE II

| | Semigloss Paint Formula III | | |
|---|---|---|---|
| | Latex | | |
| | 1A | 1G | 1H |
| Film Formation (5° C.) | Y | Y | Y |

TABLE II-continued

| | Semigloss Paint Formula III | | |
|---|---|---|---|
| | Latex | | |
| | 1A | 1G | 1H |
| Scrub Resistance (cycles) | >4000 | 1087 | 970 |
| Freeze-thaw | Fail | Fail 2$^{nd}$ Cycle | Pass |

As the data in Table II indicates, when one utilizes an emulsifier system which contains a major proportion of nonionic emulsifiers in combination with monomers having at least one carboxyl group attached directly to the olefinic carbon enhances freeze-thaw stability. However, the data also shows the disadvantage of using even small amounts such monomers, which is that they drastically reduce abrasion resistance.

EXAMPLE 7

A series of latexes was synthesized based on Example 2 varying amounts of β-carboxy ethyl acrylate and designated as Latex 1J, 1K and 1L, respectively.

| | Latex | | |
|---|---|---|---|
| | 1J | 1K | 1L |
| β-carboxy ethyl acrylate | 0.15 | 0.3 | 0.45 |
| Physical Properties | | | |
| % Solids | 55.1 | 54.7 | 57 |
| Viscosity (cps) | 2720 | 2170 | 2835 |
| PS (NM) | 372 | 375 | 389 |

EXAMPLE 8

The latexes of Example 7 were formulated into Semi-gloss Paint Formula IV and examined for F/T resistance and abrasion properties. The paints were evaluated for scrub resistance and F/T stability. Results are presented in Table III.

TABLE III

| | 1A | 1J | 1K | 1L |
|---|---|---|---|---|
| β-CEA | 0 | 0.225 | 0.3 | 0.45 |
| Scrub Resistance | 6000+ | 6000+ | 6000+ | 6000+ (Cycles) |
| F/T Stability (Cycles) | 0 | 5 | 5 | 5 |

These results show that β-carboxy ethyl acrylate provides F/T stability while maintaining excellent scrub resistance.

We claim:
1. A latex binder, comprising:
(a) a thermoplastic polymer present in amounts effective to function as a binder and film-former in a latex paint which employs the latex, said polymer consisting essentially of the emulsion polymerization product of:
(i) about 60 pphm to about 90 pphm of vinyl acetate,
(ii) about 10 pphm to about 25 pphm of ethylene; and
(iii) 0.05 to about 1.0 pphm of a monomer represented by Structure I

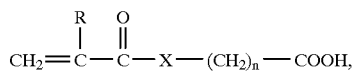

wherein R is H or CH$_3$, X is O or NH and n is an integer from 1 to 11;

(b) water; and (c) an emulsifier system present in amounts effective to disperse the polymer in the water, wherein said emulsifier system is comprised of greater than 60 weight percent of a nonionic emulsifier and less than 40 weight percent of an anionic emulsifier, based on total weight of the nonionic emulsifier and the anionic emulsifier.

2. The latex binder according to claim 1 wherein the thermoplastic polymer is prepared by emulsion polymerization of from about 70 pphm to about 90 pphm of the vinyl acetate monomer, from about 10 pphm to about 20 pphm of the ethylene monomer; and from about 0.1 pphm to about 0.8 pphm of the monomer represented by Structure I.

3. The latex binder according to claim 2 wherein the thermoplastic polymer is prepared by emulsion polymerization of from about 80 pphm to about 90 pphm of the vinyl acetate monomer, from about 10 pphm to about 15 pphm of the ethylene monomer; and from about 0.15 pphm to about 0.6 pphm of the monomer represented by Structure I.

4. The latex binder according to claim 1 wherein the emulsifier system is comprised of greater than 80 weight percent of the nonionic emulsifier and less than 20 weight percent of an anionic emulsifier, based on the total weight of the nonionic emulsifier and the anionic emulsifier.

* * * * *